(12) United States Patent
Johnson et al.

(10) Patent No.: US 7,570,175 B2
(45) Date of Patent: Aug. 4, 2009

(54) NODE DISCOVERY IN PHYSICALLY SEGMENTED LOGICAL TOKEN NETWORK

(75) Inventors: Monte Johnson, Orem, UT (US); Mark Stillings, Lehi, UT (US); David Bartholomew, Springville, UT (US)

(73) Assignee: IntelliServ International Holding, Ltd., Cayman ( * ) Notice: Subject to any disclaimer, the term of this patent is extended or adjusted under 35 U.S.C. 154(b) by 368 days.

(21) Appl. No.: 11/674,844

(22) Filed: Feb. 14, 2007

(65) Prior Publication Data

US 2007/0189166 A1    Aug. 16, 2007

Related U.S. Application Data

(60) Provisional application No. 60/766,875, filed on Feb. 16, 2006, provisional application No. 60/775,152, filed on Feb. 21, 2006.

(51) Int. Cl.
  *G01V 3/00*  (2006.01)
  *H04L 12/28* (2006.01)
  *H04L 12/42* (2006.01)
(52) U.S. Cl. .............. 340/853.1; 340/853.2; 340/853.3; 340/853.7; 340/855.3; 340/855.7; 370/254; 370/450
(58) Field of Classification Search .... 340/853.1–856.4
See application file for complete search history.

(56) References Cited

U.S. PATENT DOCUMENTS

| | | | |
|---|---|---|---|
| 5,959,547 A * | 9/1999 | Tubel et al. | 340/853.2 |
| 2002/0064163 A1 | 5/2002 | Fujiyama et al. | |
| 2002/0120401 A1* | 8/2002 | Macdonald et al. | 702/6 |
| 2004/0245017 A1* | 12/2004 | Chen et al. | 175/41 |
| 2004/0256152 A1* | 12/2004 | Dashevskiy et al. | 175/25 |
| 2005/0285751 A1 | 12/2005 | Hall et al. | |

FOREIGN PATENT DOCUMENTS

| | | |
|---|---|---|
| EP | 0096097 A1 | 12/1983 |
| EP | 0381386 A2 | 8/1990 |
| EP | 0631411 A2 | 12/1994 |

OTHER PUBLICATIONS

Marcelo Godoy Simoes et al, A Novel Competitive Learning Neural Network Based Acoustic Transmission System for Oil-Well Monitoring, Mar./Apr. 2000, IEEE vol. 35 No. 2, pp. 1-8.*
European Search Report for Application No. 07250670.2; "Documents Considered to Be Relevant;" Dated Aug. 9, 2007.
International Organization for Standardization: "Information Processing Systems—Local Area Networks—Part 4" Jul. 19, 1990.

* cited by examiner

*Primary Examiner*—Hassan Kizou
*Assistant Examiner*—Brandon Renner
(74) *Attorney, Agent, or Firm*—Victor Segura

(57) ABSTRACT

Token authorized node discovery between a plurality of store-and-forward nodes in a downhole networking environment and respective applications for data processing and communication are described herein.

20 Claims, 12 Drawing Sheets

NODE DISCOVERY IN PHYSICALLY SEGMENTED LOGICAL TOKEN NETWORK

CROSS REFERENCE TO RELATED APPLICATIONS

This application is a non-provisional application of provisional application 60/766,875, filed Feb. 16, 2006, entitled "Physically Segmented Logical Token Network" and provisional application 60/775,152, filed Feb. 21, 2006, entitled "Node Discovery in Physically Segmented Logical Token Network", and claims priority from both provisional applications. Both of the above referenced provisional patent applications are hereby incorporated by reference herein for all they disclose.

BACKGROUND OF THE INVENTION

1. Field of the Invention

Embodiments of the present invention relate to the fields of data processing and data communication. More specifically, embodiments of the present invention relate to methods and apparatus for data communication in a downhole networking environment.

2. Description of the Related Art

Advances in data processing and data communication technologies have led to development of a wide variety of data communication arrangements, including but not limited to, various on-chip, on-board and system buses, as well as local and wide area networks. These data communication arrangements are deployed in a wide range of applications, including but not limited to, data communications in harsh operating environments, such as oil and gas exploration.

As electronic exploration and drilling technology matures, the need to accurately communicate data with components located in a downhole tool string is vital to continued success in the exploration and production of oil, gas, and geothermal wells. Downhole tool string configurations often incorporate multiple downhole drilling and exploration devices for reporting temperature, pressure, inclination, salinity, and other factors at or near real-time to the surface.

Unfortunately, attempts to provide communication are hindered by various operational environment and design factors. For example, the corrosive and mechanically violent nature of a downhole drilling environment in combination with the extreme operational temperatures contributes to a rapid degradation of equipment and reduction of connectivity reliability. Additionally, the longer the downhole drilling string and/or the more tools or components attempting to share data with the surface, the more difficult the task becomes. Once the power source and bandwidth limitations are considered, the relative reliability and availability of the network to the components in the downhole tool string becomes a significant design issue. Temporary communication failure, once network connections have been established, is highly probable. With the resulting failure at any point along a serially coupled drill string, the transmission path and the corresponding flow of data to between nodes above and below the failure point will be interrupted or broken.

BRIEF DESCRIPTION OF THE DRAWINGS

The present invention will be described by way of exemplary embodiment, but not limitations, illustrated in the accompanying drawings in which like references denote similar elements, and in which.

DETAILED DESCRIPTION OF THE INVENTION AND THE PREFERRED EMBODIMENT

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment, but it may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional. In the following detailed description, the * after a reference number denotes a substitutable suffix of the reference number, e.g.

130* means 130a or 130b, and the suffixed reference number stands for the reference element in different operational network status.

Figure 1A:
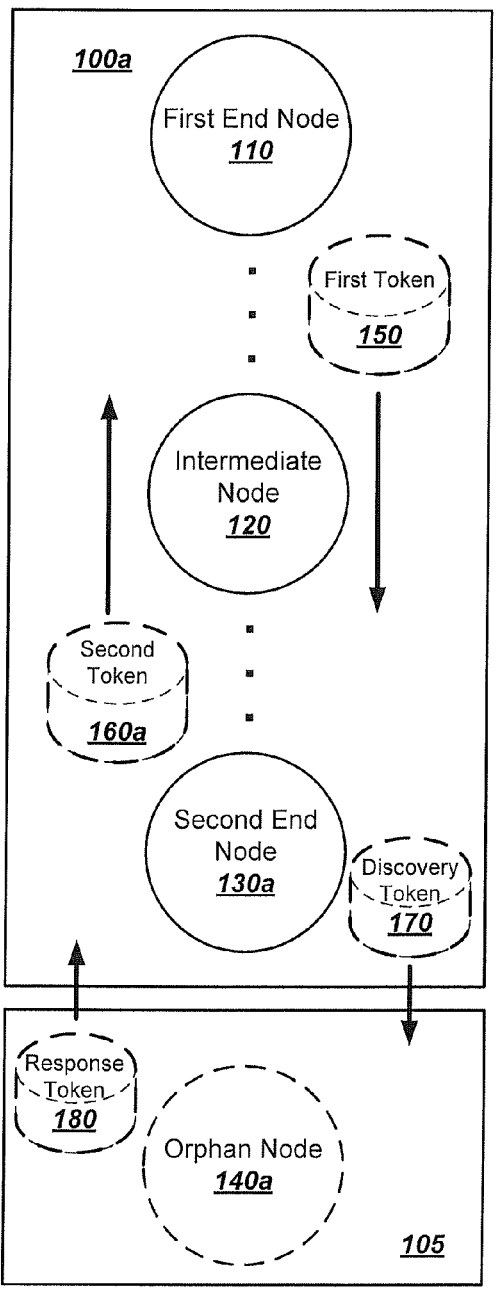
FIGS. 1A and 1B illustrate block diagrams of a data communication arrangement in accordance with various embodiments of the present invention.
Figure 1B:
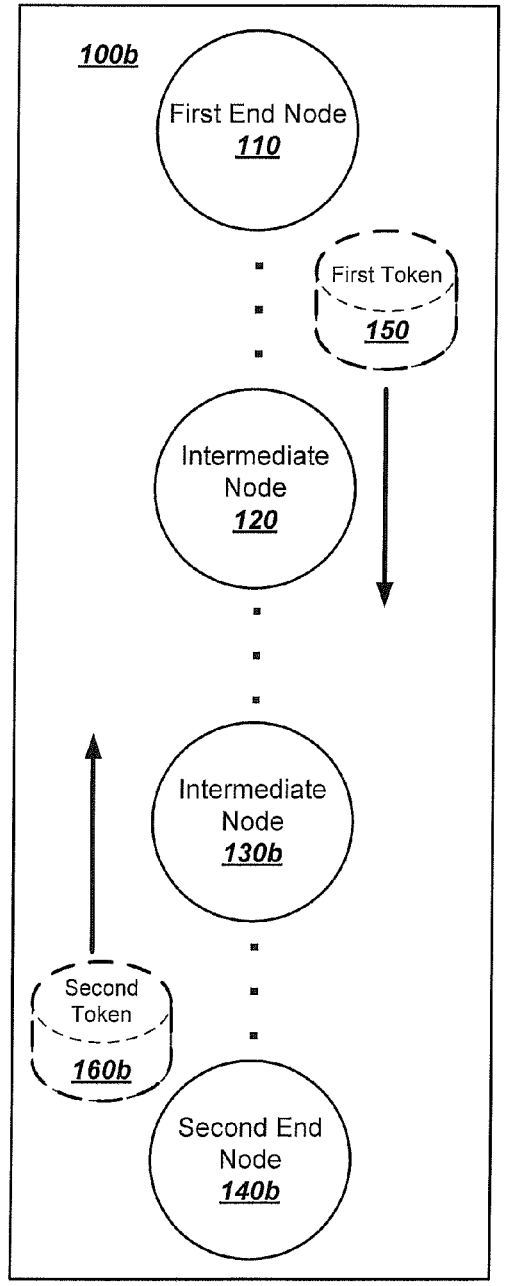

Referring to FIGS. 1A and 1B, a data communication arrangement 100* includes, according to at least one embodiment, nodes 110, 120, 130*, and 140* serially connected to each other and, using e.g. cable segments, with the nodes closest to node 110 directly connected to node 110, and the nodes closest to node 140* directly connected to node 140*. Thus, network 100* may be referred to as a physically segmented communication arrangement. Further, as will be described in more fully below, in various embodiments, nodes 110, 120, 130* and 140* communicate with each other in accordance with a communication protocol, using various tokens 150, 160, 170, 180, enabling them to effectively communicate with each other as if they are agents of a bus. Thus, for these embodiments, network 100* may also be referred to as a physically segmented logical bus, and nodes 110 and 130a/140b may be referred to as the first and second end nodes respectively.

Figure 5:
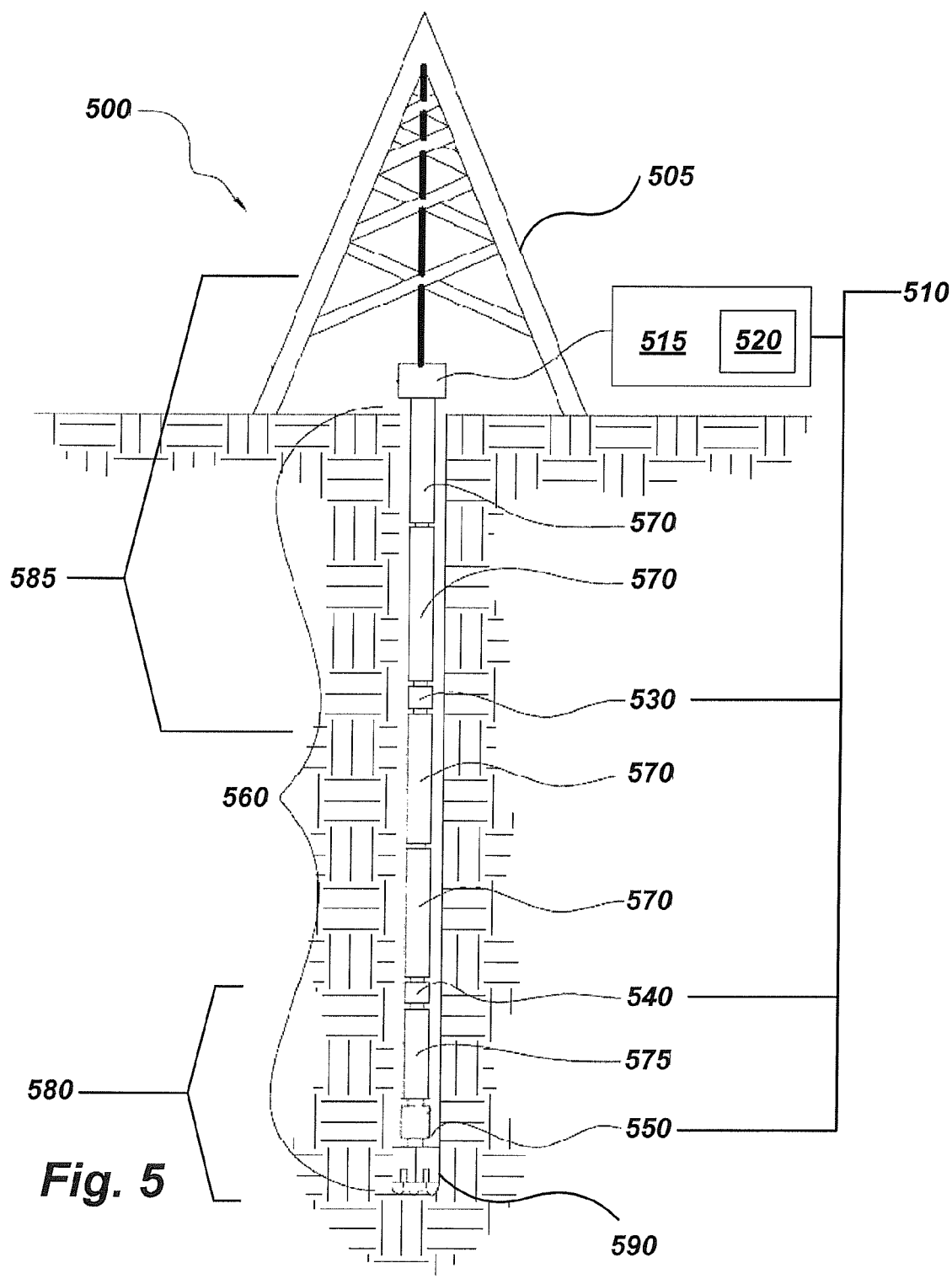
FIG. 5 illustrates a downhole networking environment suitable for practicing various embodiments of the present invention.
Figure 12:
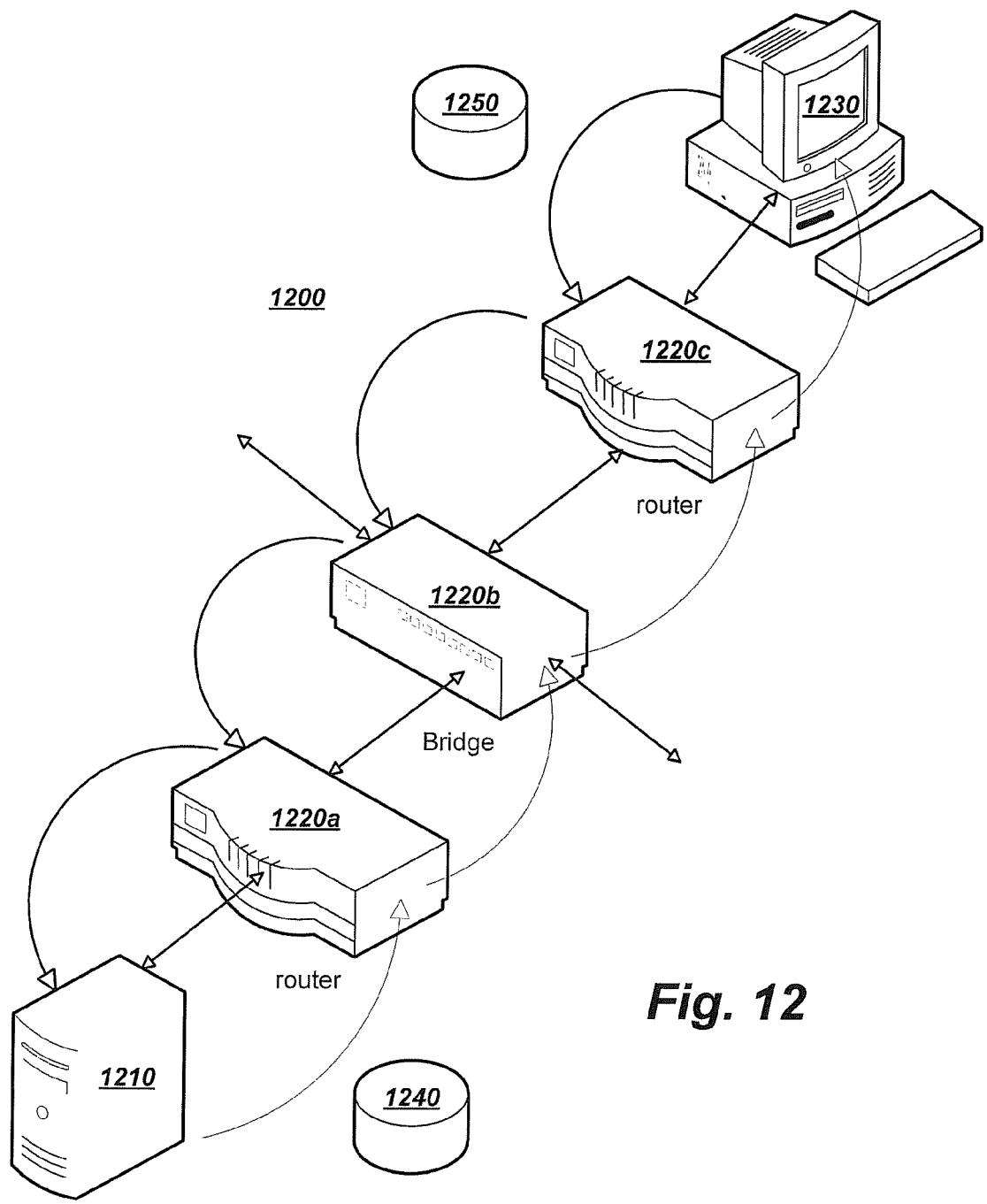
FIG. 12 illustrates another networking environment suitable for practicing various embodiments of the present invention.

In one embodiment, the network 100* is a hierarchal physically segmented logical token chain/bus downhole network as shown in more detail in FIG. 5. In a hierarchical embedment, the first and second end nodes may also be referred to as the top and bottom nodes. Alternative network configurations or portions thereof, such as the network shown in FIG. 12, may also fall within the scope of various embodiments.

Consecutive nodes, starting from first end node 110, that are transmitting and receiving data from an active network 100*, such as transmitting and receiving nodes 110, 120, and 130a forming network 100a. The active network 100b in FIG. 1B also includes transmitting and receiving node 140b. A node in a power conservation state or suspended transmission state, such as node 140a, is effectively separated from the active network 100a, while node 140a is such a state, and accordingly, may be referred to as an orphan node. As a result of orphan node 140a being separated from network 100a, successor nodes serially coupled to 140a, after node 140a, are also effectively separated from active network 100a. In various embodiments, these nodes also become orphan nodes. In other embodiments, a plurality of successive active ones of these nodes may form another active network.

In various embodiments, the nodes 110, 120, and 130*, (and 140b in active network 100b) employ at least a first token 150 and a second token 160 to facilitate data communication among the connected nodes. Alternatively, in some embodiments, the first token 150 and the second token 160 are combined in a single token to facilitate data communication among the connected nodes. Separate tokens, such as tokens 170 and 180 of active network 100a, are employed to discover nodes outside of the active network, such as orphan node 140a.

As alluded to earlier, in network 100a, the nodes 110 and 130a are the end nodes, while the nodes 110 and 140b are the end nodes of network 100b, and may be referred to as the first and second end nodes of the active network 100. One or more nodes 120 and 130b are disposed in between the end nodes, and may be referred to as intermediate nodes.

In various embodiments, each of the nodes may be similarly constituted, and operate in accordance with one of at least four operational states depending on the relative placement of the node within/outside of the network 100 including, for example, a first end node 110, at least one intermediate node 120 and/or 130b, a second end node 130a/140b, and an orphan node 140a. The various operational states from at least one embodiment of the top end node, the bottom end node, the intermediate node, and the orphan node are described in greater detail in FIGS. 2A-2D.

In various embodiments, each node 110, 120, 130*, and 140* may also be adapted to temporarily operate as an orphan node, such as 140a in FIG. 1A. In one embodiment, a node transitions to an orphan state to conserve power. A node may be also become an orphan when communications with the node are interrupted. Depending on the configuration, orphan nodes deactivate and suspend any new data transmissions until a qualifying communication is received from a neighboring node, such as a discovery token 170. In a downhole networking environment, this operational state enables the network nodes to conserve energy during various drilling operations when the network is disconnected, such as when the well increases in depth, new tubular drill pipe is added to the drill string below the top node, temporarily interrupting data communications between the nodes. Moreover, as previously indicated temporary communication disruptions in a downhole network are very probable and the orphan state allows nodes to wait until the network is ready to be reformed to re-include them before initiating further data transfers.

In the illustrated embodiments, an orphan node 140a monitors, at least periodically, communication interfaces waiting for an opportunity to reconnect to the network 100*, such as receipt of the discovery token 170. If reconnection is possible, orphan node 140a activates data transmission to transmit response token 180. Once the response token 180 has been sent, a network 100a is reformed into network 100b with orphan node 140a transitions to become the second end node 140b, and second end node 130a transitions into intermediate node 130b for future communications in the new network 100b.

Note that subsequent to orphan node 140a becoming the second end node 140a, it too might discover another successively connected node, and as a result, further transitions to become an intermediate node, with the still newly discovered successively connected node becoming the second end node. This process may continue allowing an active node to successive reform to successively re-include more and more orphan nodes.

In various embodiments, the tokens are used to direct how the different nodes in the network 100* communicate. In one embodiment, the tokens employed equalize the number of transmission opportunities afforded to each active network node. Alternatively, the tokens may also be employed to skew the number of transmission opportunities afforded to each node type. For example, in a skewed transmission configuration the network 100* may use a single token to pass from the first end node 110 to the second end node 130a/140b and back again to the first end node 110 so that the end nodes are only afforded one opportunity to transmit, but the intermediate nodes are allowed to transmit twice. Alternatively, the tokens could be skewed to allow only the end nodes to transmit data.

In one embodiment seeking to equalize the number of transmission opportunities for each node, a first token 150 is serially passed to each of the serially connected nodes of the network 100* to provide an opportunity for each node to claim the first token 150 and thereby obtaining authorization to selectively transmit nodal data (data waiting at the node) to the other connected nodes in the network 100*.

In various embodiments, the second end node 130a and 140b, and the at least one orphan node 140a employ at least a discovery token 170 and a response token 180 to facilitate node discovery and encourage data communication among all the physically connected nodes. In one embodiment, the second end node 130a selectively transmits a discovery token 170 in the "beyond" direction to determine if an orphan node 140a may be present and communication may be established (or re-established). The "beyond" direction refers to the direction opposite or away from the active network. If a communication may be established, the orphan node 140a transmits a response token 180 to the second end node 130a and begins a transition to be the next second end node 140b. Upon receipt of the response token 180, the second end node 130a determines it is no longer an end node and begins a transition to become an intermediate node 130b.

In one embodiment of a downhole network, the discovery token 170 is used to query whether a coupled orphan node is ready to rejoin the network. If the available connection is operable, and the orphan node is both operable and ready, the orphan node responds to the end node with a response token 180. Upon receipt of the response token 180 from the discovered orphan node, the bottom end node is aware that it is no longer the bottom end of the downhole network and will change its operational state to an intermediate node. Once the network is reestablished, the new second end node 140b may transmit a discovery token 170 to seek additional orphan nodes, as alluded earlier.

In various embodiments, except first end node 110 and second end node 130a/140b, each intermediate node 120 and/or 130b is adapted to transmit new nodal data in both directions, i.e. to both neighboring nodes, upon obtaining authorization to transmit. For these embodiments, since each of first end node 110 and second end node 130a/140b have only one neighboring node, both end nodes during normal operation (that is when not discovering orphan nodes) transmit only in one direction, to its directly connected intermediate node 120 or 130b.

An iteration of data communication as described herein represents the process of providing each active node with an opportunity to claim a token during normal operation, which selectively authorizes data transmission by the node to other nodes, as the token passes from a first end node, through the one or more intermediate nodes, to a second end node. In one embodiment, the node discovery process is performed each discovery iteration of data until the physical end node is reached.

In various embodiments, a node, upon claiming the first token 150, will transmit data originally transmitted together with the claimed token to the next node without the token. This modified transmission is then followed by a new transmission from the node of the previously claimed token and the nodal data to the two immediate neighboring nodes. In various embodiments, only the successor node of an intermediate node (i.e. the immediate neighboring node towards second end node 130a/140b) can claim the first token included in this "new" transmission, to create another opportunity to transmit nodal data. The predecessor node (i.e. the immediate neighboring node towards first end node 110) will merely pass the first token and the data to its predecessor node.

Thus, for these embodiments, starting with first end node 110, each successive node 120, and eventually second end node 130a/140b, will successively has an opportunity to transmit nodal data. Further, for these embodiments, the transmitted nodal data will in due course be seen by each node of the network, regardless whether a node is a targeted recipient of the transmitted data or not, as if the nodes are agents of a bus (notwithstanding the fact that the nodes are not physically connected to common data transmission lines).

Nodal data as referenced in the specification is generally data waiting at and/or transmitted from one specific node to other nodes, once the specific node claims the first token (e.g., a down-token in a downhole network). As described earlier, nodal data is often transmitted by an intermediate node in both directions along the network. In one embodiment, once the nodal data is transmitted to another node, it simply becomes received data to be passed along the network. In contrast to nodal data, the received data is simply stored in the intermediate node for further analysis and a duplicate copy is forwarded by the intermediate node to the next node. Thus, for these embodiments, the nodes may also be referred to as store and forward nodes.

While the first token 150, is employed to successively authorize the nodes to transmit data, the second token 160 is employed to restart the process again, once each node has been given an opportunity to claim first token 150 to transmit nodal data (i.e. first token 150 having reached second end node 130a/140b). The second token 160 is originated and passed from the second end node 130a/140b back to the first end node 110. Unlike first token 150, second token 160 is passed from second end node 130a/140b, through intermediate node(s) 120, to first end node 110, without being claimed by any intervening node 120. In various embodiments, the second token 160 is passed along with nodal data from the second end node 130a/140b to the first end node 110, via the at least one intermediate node 120.

In various embodiments, transmission of tokens is effectuated by including the tokens in the data packets, in particular, headers of the data packets. In various embodiments, claiming of tokens is effectuated by modifying the headers of the data packets to effectuate removal of the tokens from the headers. In alternate embodiments, other techniques may be employed to transmit and claim tokens.

Of course, embodiments are not limited to the token-passing protocol as described and shown. In fact, many possibilities exist for specific embodiments of token-passing protocols along the network 100*. For example, the token could be passed sequentially to each node 110, 120, 130*/140* starting in the first node 110 and ending at the second end node 130a/140b and then back up the network 100* starting in the second end node 130a/140b and ending in the first end node 110. The cycle of sequential transmission may then repeat itself as many times as are needed. In such an embodiment, the at least one intermediate node 120 would receive twice as many opportunities to transmit data on the network 100* than the end nodes 110 and 130a/140b, but there may be specific applications in which that particular characteristic is desirable. Alternatively, a network may also be envisioned where only certain nodes are allowed to transmit data and other nodes are limited to receiving and re-transmitting the data. In yet another alternative configuration, the network may assign dynamic priority levels to various nodes based in part on the information being transmitted and/or the designated collection priorities of the network.

Other embodiments may include the consideration of additional variables as criteria which must be met before a node 110, 120, 130*, 140b is permitted to claim a circulating token. For example, data ready to be transmitted on the network 100* may be assigned a priority level indicative of their relative importance compared to other data waiting at other nodes to be transmitted. In cases where it is more urgent to transmit some data on the network 100* than other data, the protocol may dictate that only a node 110, 120, 130*, 140b with data to transmit that has been assigned a certain priority level or higher may claim the token when an opportunity to claim the token arises.

In addition to the previously described configurations, several other different network configurations are possible, including for example one embodiment, where only one intermediate node 120 is used, the only one intermediate node 120 being immediately coupled to both the first end node 110 and the second end node 130a. Alternatively, in one embodiment, the only one intermediate node 120 and the second end node 130a are the same node and are immediately coupled to the first end node 110.

Figure 2A:
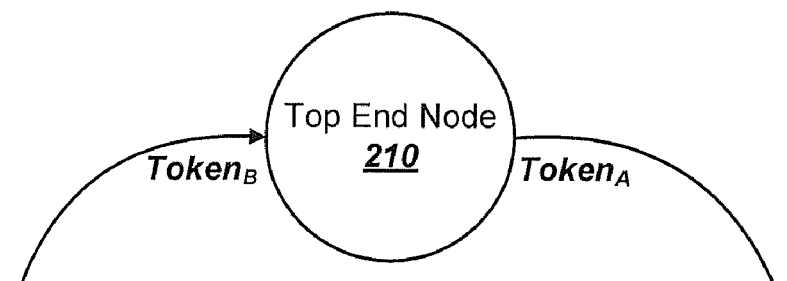
FIGS. 2A-2D illustrate block diagrams of network nodes of FIGS. 1A and 1B, in accordance with various embodiments of the present invention.

Turning now to FIGS. 2A-2D, the particular operational state interfaces of various network nodes in a downhole network, in accordance with various embodiments, are described. In FIG. 2A, a top end node 210 is illustrated. As previously described, the top end node 210 receives tokens from the network below (TokenB) and transmits tokens to other nodes in the network from above (TokenA). In one embodiment, a TokenA is a down-token and a TokenB is an up-token in a downhole network. In another embodiment, a TokenA is a first token 150 and a TokenB is a second token 160. The top end node 210 is configured to generate a first token. In one embodiment, the first token may be generated upon expiration of a response timer. Alternatively, the first token may also be generated upon receipt of a second token different from the first token at a communication interface of the top end node 210. The top end node 210 transmits the first token via the same communication interface to the first immediately coupled successor node to facilitate selective data communication between nodes.

Figure 2B:
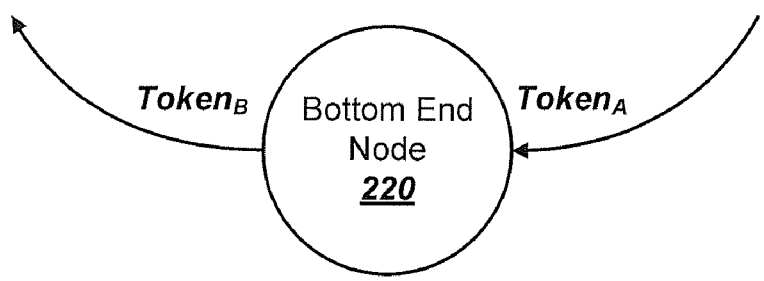

In FIG. 2B, a bottom end node 220 is illustrated. In contrast to the top end node 210, the bottom end node 220 receives tokens from the network above (TokenA) and transmits tokens to other nodes in the network from below (TokenB). Both the top end node 210 and the bottom end node 220 only maintain connections in one relative direction, down for the top end node 210 and up for the bottom end node 220.

Figure 2C:
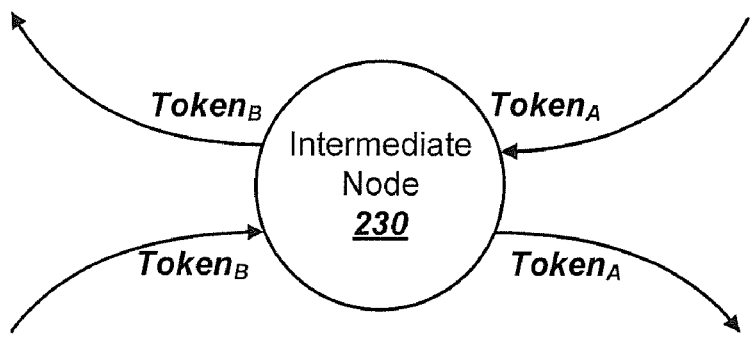

In FIG. 2C, an intermediate node 230 is illustrated. As previously described the intermediate node 230 may receive and transmit tokens in both directions in a downhole network. More specifically, tokens are received at the intermediate node 230 from other network nodes logically positioned above (TokenA) and below (TokenB) and tokens are transmitted by the intermediate node 230 to other network nodes in the network logically positioned above (TokenA) and below (TokenB). The intermediate node receives a first token, from a second immediately coupled predecessor node and transmits the token to a second immediately coupled successor node and/or receives another token, different from the first token, from the second immediately coupled successor node. The intermediate node transmits the received token to the other immediately coupled node, successor or predecessor.

Figure 2D:
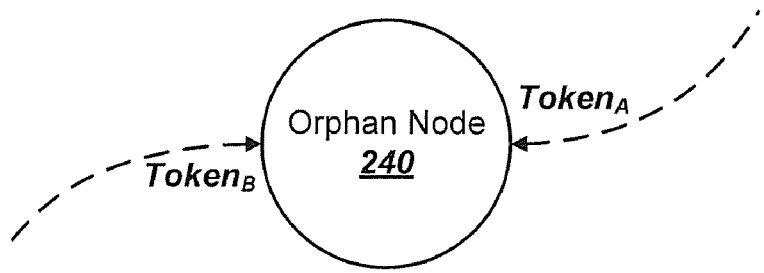

In FIG. 2D, an orphan node 240 is illustrated. The orphan node 240 is not attached to the network, but monitors directly connected transmission segments for tokens that are received from other network nodes above (TokenA). In one embodiment, the orphan node 240 may also monitor directly connected transmission segments for tokens received from other network nodes positioned below the network node (TokenB). In one embodiment, the orphan node 240 suspended transmissions due to the expiration of a response timer, and will remain suspended until a discovery token is received via the at least one communication interface, from an immediately coupled predecessor node. Upon receipt of the discovery token, the orphan node 240 is configured to generate and to transmit a response token, via the at least one communication interface, to the immediately coupled predecessor node.

Figure 3A:
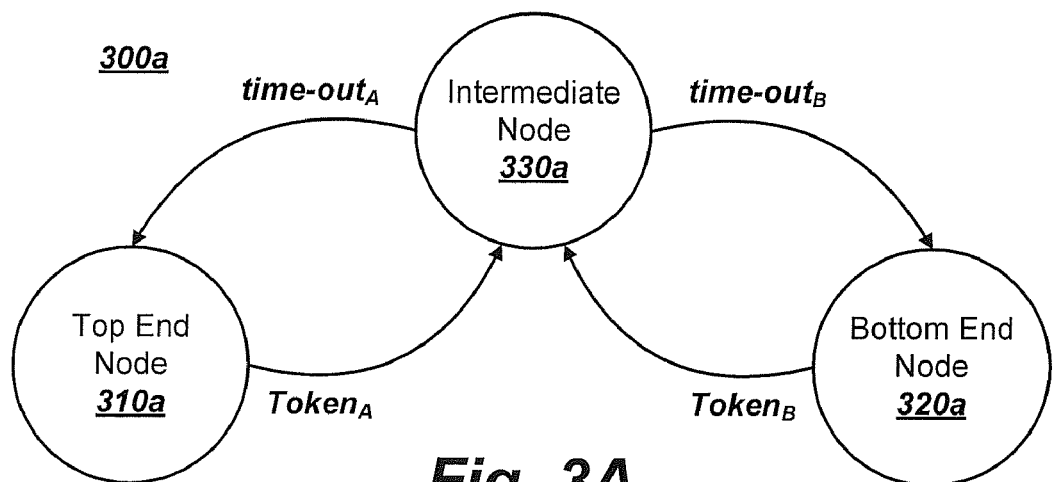
FIGS. 3A-3C illustrate state diagrams of network nodes of FIGS. 1A and 1B, in accordance with various embodiments of the present invention.
Figure 3B:
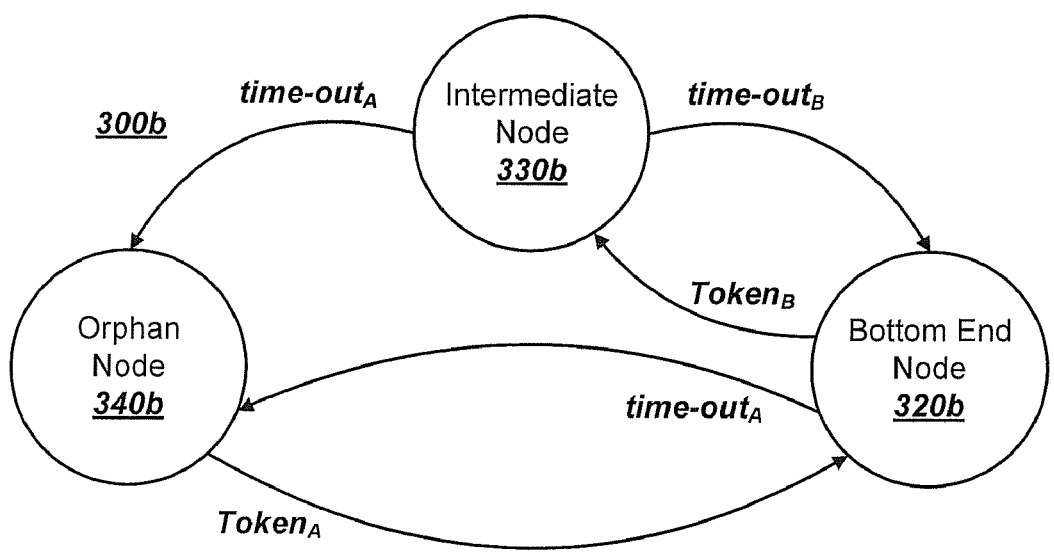
Figure 3C:
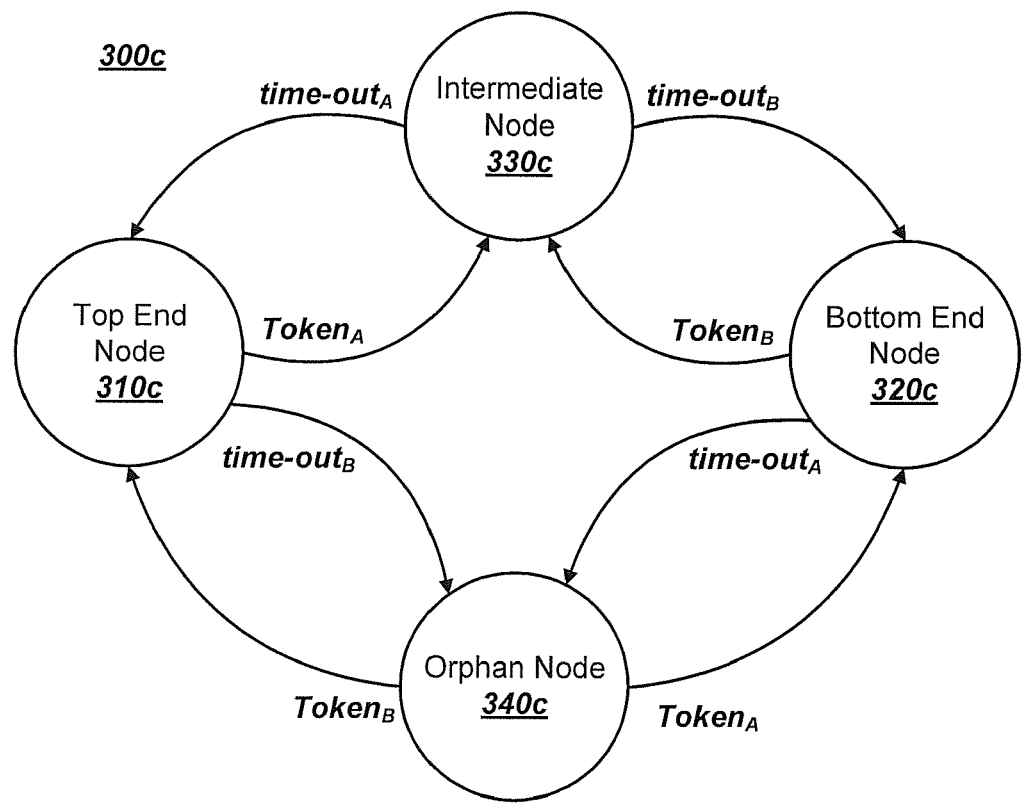

Turning now to FIGS. 3A-3C, the particular methods of the invention, in accordance with various embodiments, are described in terms of operational state diagrams illustrating the state transitions of the various network nodes 310, 320, 330, and 340 in a downhole network 300. In FIG. 3A, a first embodiment 300a, where each node is equipped to transition from being a top end node 310a, a bottom end node 320a, and an intermediate node 330a of a network 300a is shown. In this embodiment, a network node may transition between one of the three operational states: an operating state operating the node as a top end node 310a, an operating state operate the node as a bottom end node 320a, and an operating state operating the node as an intermediate node 330a. In one embodiment, a network node will initialize to operate as an intermediate node 330a, and upon so initialized, reset timeout timers for communication interfaces associated with communications received from above the node and below the node. Upon expiration of one of the timers, the node will transition itself into a new operating state to operate itself either as a bottom end node 320a (if time-outB timer expires) or as a top end node 310a (if time-outA timer expires). The time-outB timer expires when no communication is received from below the node, implying that the node has become the bottom end of the network 300a. Communication with the previous successor node has been severed. The time-outA timer expires when no communication is received above the node, implying that the node has become the top end of the network 300a. Communication with the previous predecessor node has been severed. From the operating state of a top end node 310a, the node transitions back to an operating state to operate as an intermediate node 330a if a TokenA is received from above, as the receipt of the token from above indicates that the node is no longer the top node of the network 300a. From the operating state of a bottom end node 320a, the node transitions back to an operating state to operate as an intermediate node 330a if a TokenB is received from below, as the receipt of the token from below indicates that the node is no longer the bottom node of the network 300a. This operational state configuration enables the network 300a to have multiple sub-networks in operation at any given time, each sub-network having a different top end node 310a, bottom end node 320a, and intermediate node 330a.

In FIG. 3B, an alternate embodiment 300b where each node monitors for communication from above, and transitions its operational state based on the monitored above communication, is shown. As illustrated, a network node 300b may operate in an operating state as a bottom end node 320b, an operating state as an intermediate node 330b, and an operating state as an orphan node 340b. In other words, the top end node has been assigned to a specific node.

In one embodiment, a network node will initialize to operate as an intermediate node 330b and thus resets time-out timers for communication interfaces associated with communications received from above the node and below the node. Alternatively, in a network configured to discover only new bottom nodes, the network node could initialize to operate as an orphan node 340b and wait for a TokenA to be received from above before transitioning to bottom end node 320b.

Upon expiration of one of the timers, the node operating as an intermediate node 330b will become either a bottom end node 320b (time-outB timer expires) or an orphan node 340b (time-outA timer expires). As with the previous configuration the time-outB timer expires when no communication is received from below the node, implying that the node is the bottom end of the active network. In contrast, when the time-outA timer expires after no communication is received above the node, the node is assumed to not yet be connected to the active network and transitions to the orphan state. The orphan node 340b transitions back to a bottom end node 320b if a TokenA is received from above, as the existence of the token indicates that the node is no longer an orphan. The bottom end node 320b transitions back to an intermediate node 330b if a TokenB is received from below, as the existence of the token indicates that the node is no longer the bottom node of the active network. This operational state configuration enables the active network to add nodes one at a time from the bottom.

Alternatively, the alternate embodiments could also be configured to load from the top instead of the bottom. This configuration would replace the bottom end node 320b with a top end node and substitute TokenA and time-outA timer for the TokenB and time-outB timer. Both top load and bottom load configurations are useful in downhole networks, where networks are linear and segmented.

In FIG. 3C, an alternate embodiment 300c where each node is adapted to use all four operational states is shown. Each node may operate in an operational state as a top end node 310c, another operational state as a bottom end node 320c, still another operational state as an intermediate node 330c, and a final operational state as an orphan node 340c. In this embodiment, a network node may transition between the four operational states.

In one embodiment where upon discovery a new network node may be either added to the top or the bottom of the network, a new network node initializes in an operational state and operate as an orphan node 340c and waits for either a TokenA or a TokenB to be received. If the first received token is a TokenA received from an immediately coupled predecessor node then the node operating as an orphan node 340c resets time-outA timer and transitions to an operational state to operate as a bottom end node 320c. Alternatively, if the first received token is a TokenB received from an immediately coupled successor node then the node operating as an orphan node 340c resets time-outB timer and transitions to an operational state to operate as a top end node 310c. As the active network expands by discovering additional network nodes from either end, the node may transition from operating as either a top end node 310c or a bottom end node 320c to an operational state to operate as an intermediate node. From the operating state operating as a top end node 310c, the node transitions to an operational state to operate as an intermediate node 330c upon receiving a TokenA from an immediately coupled predecessor node. From the operating state operating as a bottom end node 320c, the node transitions to an operating state to operate as an intermediate node 330c upon receiving a TokenB from an immediately coupled successor node.

In each case described and illustrated in FIGS. 3A-3C, upon receiving a packet or token, a node may automatically reset the respective timer associated with the communication interface through which the packet is received. Expiration of the timer through communication inactivity often affects whether the node transitions to a new operational state. For example, in FIG. 3C, if the time-outB timer expires, then a node operating as an intermediate node 330c transitions to an operational state to operate as a bottom end node 320c and a node operating as a top end node 310c transitions to an operational state to operate as an orphan node 340c. If the time-outA timer expires, then a node operating as an intermediate node 330c transitions to an operational state to operate as a top end node 310c and a bottom end node 320c transitions to an operational state to operate as an orphan node 340c. Accordingly, for these embodiments, a node operating as a bottom end node 320c remains the bottom end node 320c if the time-outB timer expires, and a node operating as a top end node 310c remains the top end node 310c if the time-outA timer expires.

As shown in FIGS. 3A-3C, a wide variety of alternate and/or equivalent state operational implementations may be substituted for the specific embodiments shown and previously described without departing from the scope of the present invention. For example, in one embodiment where successor nodes are dependent on predecessor nodes, the timers for successor nodes may selectively expire contemporaneously with a predecessor node timer, thereby expediting the transition to an orphan node for a series of successor nodes. Accordingly, in another embodiment where predecessor nodes are reliant on successor nodes, the timers for a series of predecessor nodes may selectively expire contemporaneous with a successor node timer expiration, thereby expediting the transition for the linked nodes to an orphan node operational state.

Figure 4:
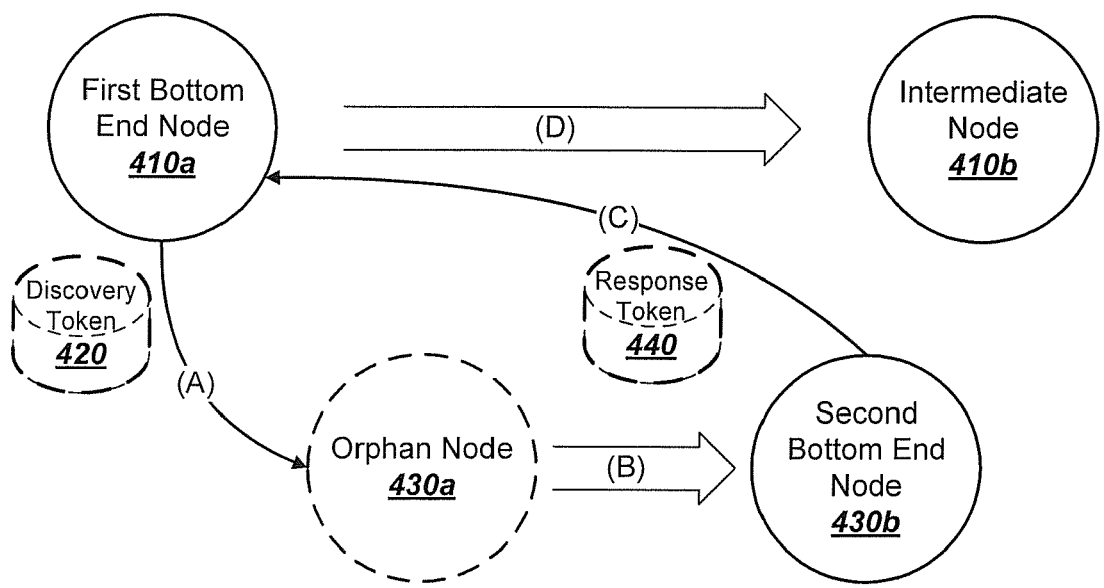
FIG. 4 illustrates a block diagram of two network nodes in accordance with various embodiments of the present invention.

Referring now to FIG. 4, a block diagram demonstrating a dual transition for two nodes (410* and 430*) from an initial operational state to a subsequent operational state in accordance with various embodiments is shown. Initially, first bottom end node 410a transmits a discovery token 420 to orphan node 430a, see (A) in FIG. 4. In one embodiment, the first bottom end node 410a begins node discovery upon expiration of a discovery timer. Alternatively, node discovery might also begin automatically upon receipt of a token, such as a first token or a down-token.

Upon receipt of the discovery token, the first node operating as an orphan node 430a transitions to operate as a second bottom end node 430b, see (B) FIG. 4, and transmits a response token 440 back to the node operating as the first bottom end node 410a, see (C) FIG. 4. Upon receipt of the response token 440, the node operating as the first bottom end node recognizes that it is no longer the bottom node and transitions to operate as an intermediate node 410b, see (D) FIG. 4. Thus, during the next round of communication the network will have introduced a new bottom node with second bottom end node 430b and established a new intermediate node 410b.

When drilling boreholes into earthen formations, a drilling operation 500 as shown in FIG. 5 may be used. The drilling operation 500 may include a drilling rig 505, an integrated downhole physically segmented logical token network 510, and a tubular drill string 560 having a bottom hole assembly 580. The bottom hole assembly 580 typically forms the bottom of the drill string 560, which is typically rotatably driven by a drilling rig 505 from the surface. In addition to providing motive force for rotating the drill string 560, the drilling rig 505 also supplies a drilling fluid under pressure through the tubular drill string 560 to the bottom hole assembly 580. Other components of the bottom hole assembly 580 include a drill collar 575, a drill bit 590, and various other down hole components. In operation, the drill bit 590 is rotated and weight is applied. This action forces the drill bit 590 into the earth, and as the bit is rotated, a drilling action is effected.

The downhole physically segmented logical token network 510 includes a first end node and/or a top node 520, a plurality of transmission segments integrated into the drill pipe 570, a plurality of intermediate nodes and/or middle nodes 530 and 540, and the second end node and/or a bottom node 550. The downhole network 510 provides an electrical interconnection between the top node 520 and the bottom node 550. The top node 520 may, in accordance with at least one embodiment, be a component of a server 515. The server 515 is positioned near the top of the well in one embodiment and may relay reconstituted well information gathered from various components in the downhole network 510 to a variety of interested client computing devices across an area network, such as the Internet, using traditional methods known in the art.

The downhole network 510 operates similar to the previously described network of FIG. 1, although features may be described in a more directional nature, for example, in the downhole network 510 a first token may be a down-token, and a second token may be an up-token or the first end node represented by a top end node and the second end node represented by a bottom end node. As such, the down-token is a logical token generated by the top node 520 that the individual nodes (530, 540, and 550) are cyclically and/or periodically allowed to claim. In one embodiment that tries to equalize the number of transmission opportunities for each node, the up-token is a logical token that only the top node 520 is allowed to claim.

Although the down-token has been characterized in one embodiment to be an equivalent to the first token and the up-token is characterized as an equivalent to the second token, it is clear to one of skill in the art that other characterizations are possible and considered within the scope of the instant invention. For example, the roles of the up and down tokens could be reversed. Moreover, the up-token and the down-token could be the same logical token. In such a configuration, a directional modifier may be assigned at each node based in part on which communication interface received the token.

As previously indicated, a downhole network 510 is often a difficult and or discontinuous operating environment. For example, as the well increases in depth, new tubular drill pipe is added to the drill string below the top node 520, temporarily interrupting data communications between the nodes. Additionally, portions of the drill string may become temporarily unavailable due to mechanical stresses related to drilling operations. As a result in one embodiment, each intermediate node (530 and 540) may become the bottom node 550 when no data and/or token are received from a successor immediately coupled node for a designated time period based in part on the number of nodes in the downhole network 510.

In various embodiments, the top node 520 is configured to selectively generate another down-token even if the up-token is not received within a designated time period. The designated time period is often based in part on the number of known active nodes in the downhole network.

Depending on the importance of the data being collected by the portion of the network 510 in the bottom hole assembly 580, temporarily interrupting data may be unacceptable. In these situations the network may employ multiple sub-networks to divide the network 510 and continue data communication. For example the illustrated network 510 may be divided into two sub-networks, the portion of the network 510 in a bottom hole assembly 580 and the top portion of the drill string 560 associated with a sub-network 585. In various embodiments, an entire sub-network, e.g. all the nodes of sub-network 510, may transition to an orphan operational status to conserve power or preserve data through active manipulation of timing devices associated with the end node of the sub-network.

Figure 6:
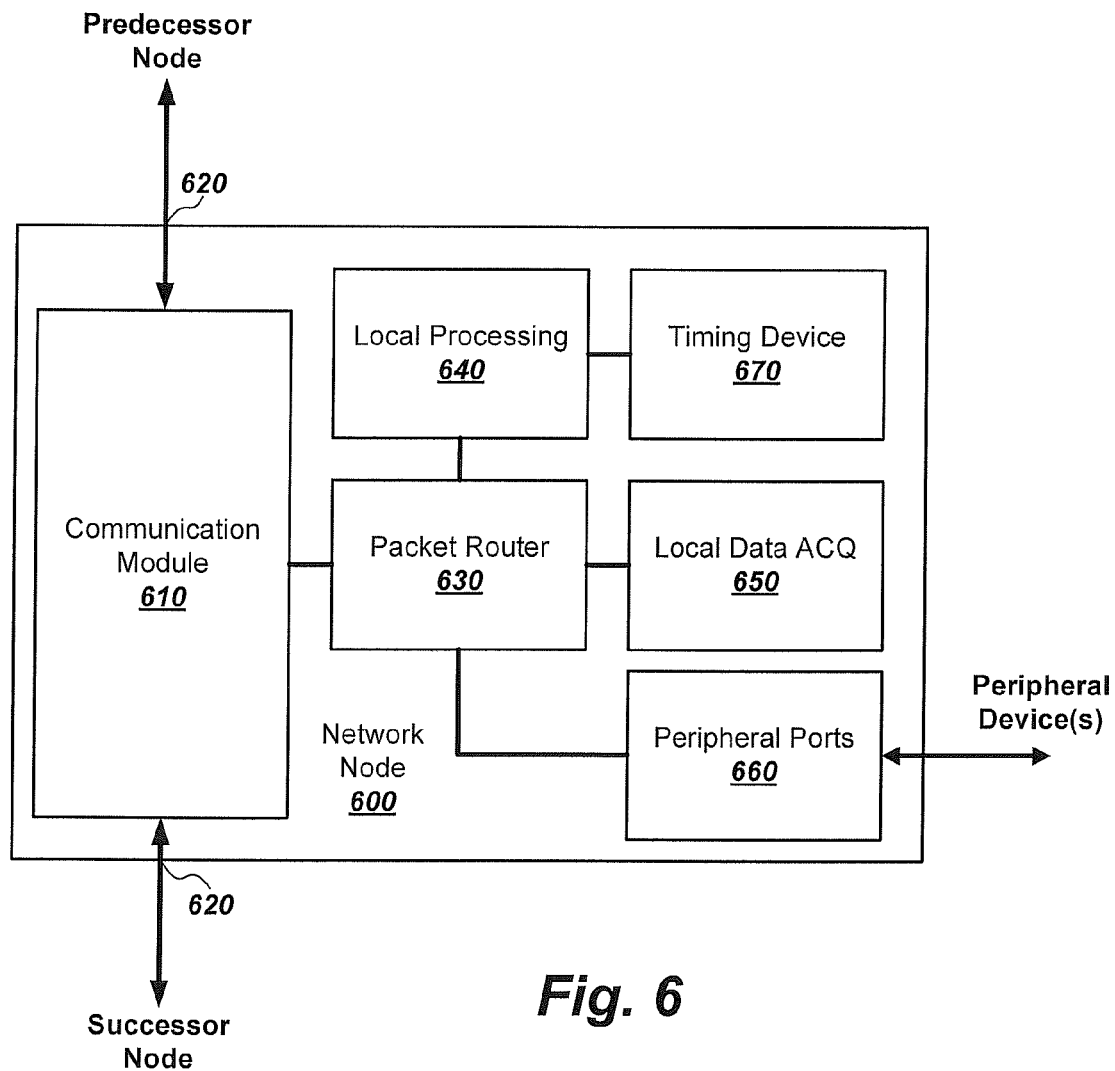
FIG. 6 illustrates a network node suitable for practicing various embodiments of the present invention as presented in FIGS. 1A and 1B and in FIG. 5 in further detail, in accordance with various embodiments.

Other modifications may also be made to each network node (520, 530, 540, and 550) in the downhole network 510 to facilitate data processing and data communication. An exemplary downhole network node 600 suitable for practicing various embodiments as presented in FIG. 5 is shown in FIG. 6, a block diagram of a downhole network node 600 having at least one communication interface 620 and a communication module 610. The network node 600 includes at least one communication interface 620, a communication module 610, a packet router 630, a local processing module 640, and a local data acquisition module 650, coupled to each other as shown.

The illustrated communication module 610, such as a modem, may be connected to the network 510 in at least two directions. However, in alternate configurations the communication module 610 may only be connected to the network 510 in one direction. The communication module 610 may modulate digital bits on an analog signal to transmit data packets from the network node 600 on the network 510 and demodulates analog signals received from the network 510 into digital data packets.

The network node 600 may comprise a packet router 630 that receives packets from the communication module 610 and forwards them to one or more of a local processing module 640, a local data acquisition module 650, or a peripheral port 660. Packets to be transmitted on the network 510 may also be forwarded to the communication module 610 from the packet router 630.

The downhole network node 600 includes a peripheral tool port 660, which allows the downhole network node 600 to collect data from associated tools, packetize the tool data and transmit it to the top of the well.

As previously indicated, a network node 600 may also employ a timing device 670 to calculate whether time-out thresholds have been reached as described in FIGS. 3, 4, 7, 8, 9 and 10. The timing device 670 may include multiple timers individually assigned to each communication interface 620 or to communication module 610 in general.

Turning now to FIGS. 7-11, the particular methods of the invention, in accordance with various embodiments, are described in terms of computer firmware, software, and hardware with reference to a series of flowcharts. In various embodiments, portions of the operations to be performed by network devices may constitute state machines or computer programs made up of computer-executable instructions. Describing portions of the operations by reference to a flowchart enables one skilled in the art to develop programs including instructions to carry out the illustrated methods on suitably configured network devices (e.g., a processor of the network device executing instructions from a computer-accessible media).

In various embodiments, the computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the embodiments as described herein. Furthermore, it is common in the art to speak of software, in one form or another (e.g., program, procedure, process, application, etc.), as taking an action or causing a result. Such expressions are merely a shorthand way of saying that execution of the software by a network device causes the processor of the computer to perform an action or a produce a result.

Figure 7:
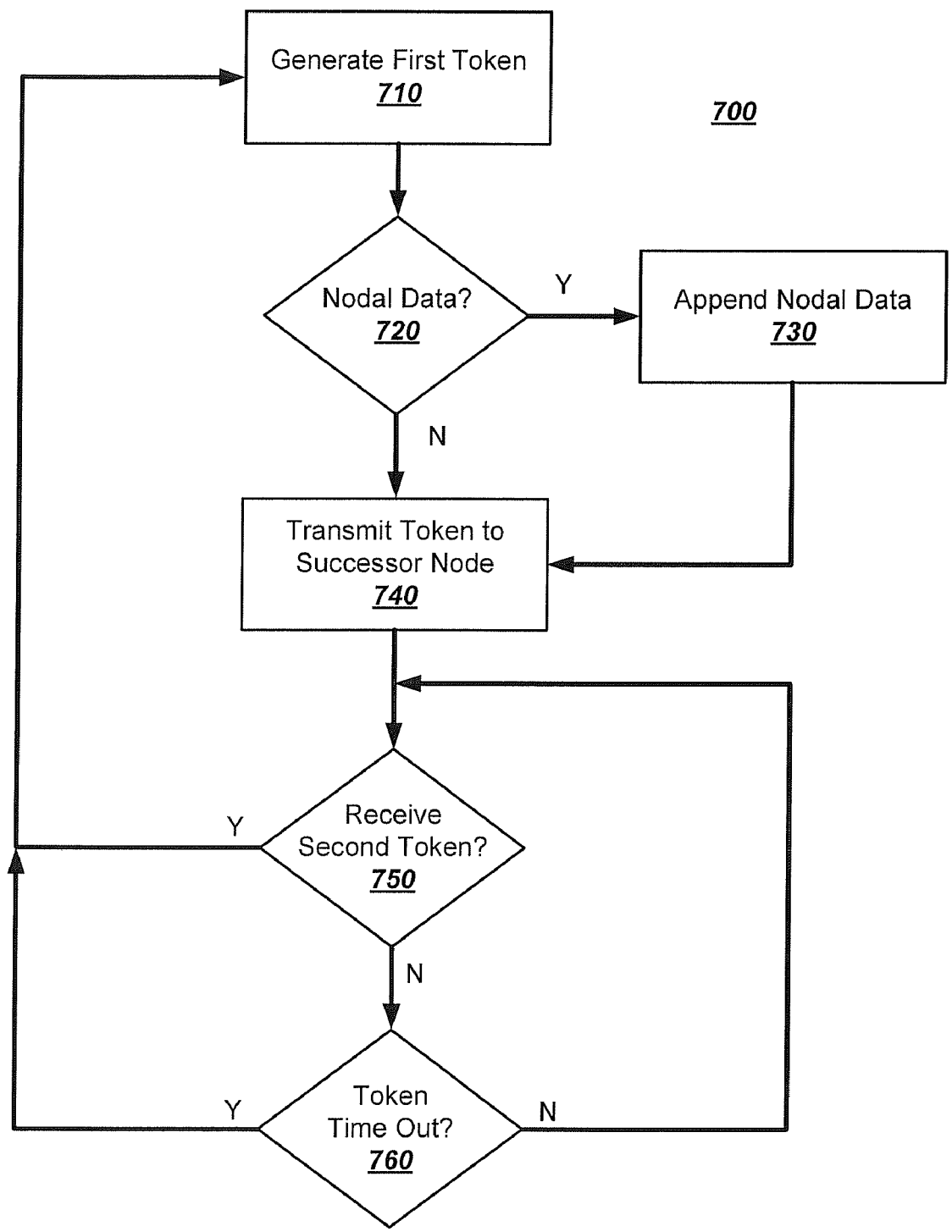
FIG. 7 illustrates a flowchart view of a portion of the operations of a first end node as presented in FIGS. 1A and 1B in further detail, in accordance with various embodiments.

Referring to FIG. 7, a flowchart of a portion of the operations of a node operating as a first and/or top end node 700 in accordance with various embodiments is shown. In block 710, a node operating as the first end node 700 generates a first token. The node operating as the first end node 700 determines whether nodal data is available to be transmitted with the first token in query block 720. If nodal data is available, then the node operating as the first end node 700 appends the nodal data to the packet for transmission with the token in block 730. In one embodiment, the process of transmitting nodal data from the node operating as the first end node includes combining the nodal data and the first token into a single data packet to be transmitted together to a successor node in block 740. Alternatively, if the node operating as the first end node 700 does not have any additional nodal data to transmit, the token may be transmitted without first end nodal data to a successor node in block 740.

In query block 750, the node operating as the first end node 700 determines whether a second token has been received. Upon receipt of the second token, query block 750 directs the node operating as first end node 700 back to block 710 to generate another first token. Alternatively, if the second token has not been received, query block 760 determines whether a time-out threshold has been reached for delivery of the second token. In one embodiment, the time-out threshold is a variable time period based in part on the number of nodes in the network. The threshold may also be based in part on various other factors such as the potential size of packets being transmitted, the potential latency between a packet being received at a node and the transmission of the packet to the next node, and whether other packets have been received at the first end node 700 since the previous first token was previously transmitted in conjunction with block 740.

Once the time-out threshold is reached, query block 760 directs the operations of the node operating as the first end node 700 to generate the first token in block 710. In one embodiment, query block 760 may be implemented using a timing device with a timer configured to countdown to zero from a max response time. In this configuration the timer may be reset each time a packet is received by the first end node or in the alternative each time a token is received. Prior to reaching the time-out threshold, the node operating as the first end node 700 continues to wait for either the arrival of the second token at query block 750 or the expiration of a time-out timer associated with the token in query block 760.

Figure 8:
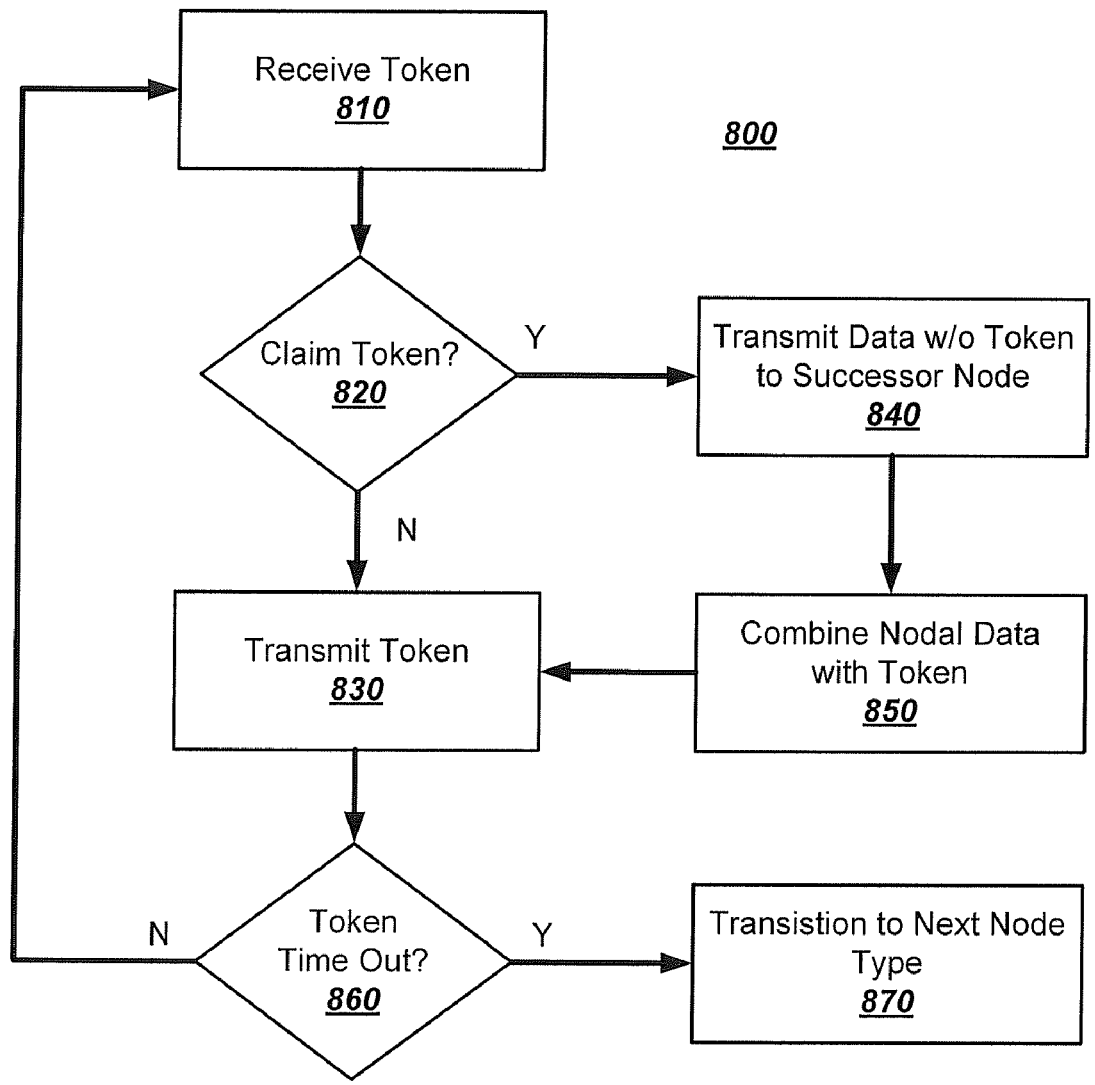
FIG. 8 illustrates a flowchart view of a portion of the operations of an intermediate node as presented in FIGS. 1A and 1B in further detail, in accordance with various embodiments.

Referring now to FIG. 8, a flowchart of a portion of the operations of a node operating as an intermediate node 800 in accordance with various embodiments is shown. The node operating as the intermediate node 800 receives a token in block 810. The first token may be received from an immediately coupled predecessor node in the physically segmented logical token network and the second token may be received from an immediately coupled successor node in the physically segmented logical token network. As such, the tokens, in a downhole network, may be received from an immediately coupled node physically positioned either above or below the intermediate node 800. Upon receiving the token, the node operating as the intermediate node 800 in query block 820 determines whether it may claim the token (e.g., for earlier described embodiments, whether the token is a first token 150). In one instance, the node operating as the intermediate node 800 in query block 820 determines whether the token may be claimed and whether it has additional nodal data to transmit to the other nodes in the physically segmented logical token network. In one embodiment, certain tokens (such as token 160) may not be claimed by an intermediate node regardless of whether nodal data needs to be transmitted. Once the node operating as the intermediate node 800 in query block 820 determines that the token may be claimed and that it has nodal data to be transmitted, the node operating as the intermediate node 800 claims the token and transmits the data in the packet without the token to the successor node in block 840. The node operating as the intermediate node then combines the nodal data with the token in block 850 for transmission on the network to both immediately coupled nodes in block 830. Alternatively, if the node operating as the intermediate node 800 determines that the token may not be claimed in query block 820, (e.g., the token is a second token 160) then the received token is transmitted to the next different immediately coupled node in block 830. For example, the node operating as the intermediate node 800 transmits the unclaimed token to the immediately coupled predecessor node if the token was received from the immediately coupled successor node and to the immediately coupled successor node if the token was received from the immediately coupled predecessor node.

As with the node operating as the top end node in FIG. 7, the node operating as the intermediate node 800 may also compute whether a time-out threshold has been reached in query block 860 prior to returning to block 810. However, this time-out threshold will be based on whether either a first or second token has been received. In one embodiment, the intermediate node has two time-out thresholds, each being a variable time period based in part on the number of nodes in the network between the intermediate node and the end node. Depending on which one of the thresholds is reached prior to receipt of a new token, the node operating as the intermediate node 800 may transition to either an orphan node, first end node, or a second end node in block 870. For example, on timing-out for first token 150, a node operating as an intermediate node 800 may transition to operate as a first end node, and on further timing-out for second token 160, the node operating as the intermediate node 800 transitions to operate as an orphan node. On the other hand, on timing-out for second token 160 first, a node operating as an intermediate node 800 may transition to operate as a second end node, and on further timing-out for first token 150, the node operating as the intermediate node 800 transitions to operate as an orphan node.

Figure 9:
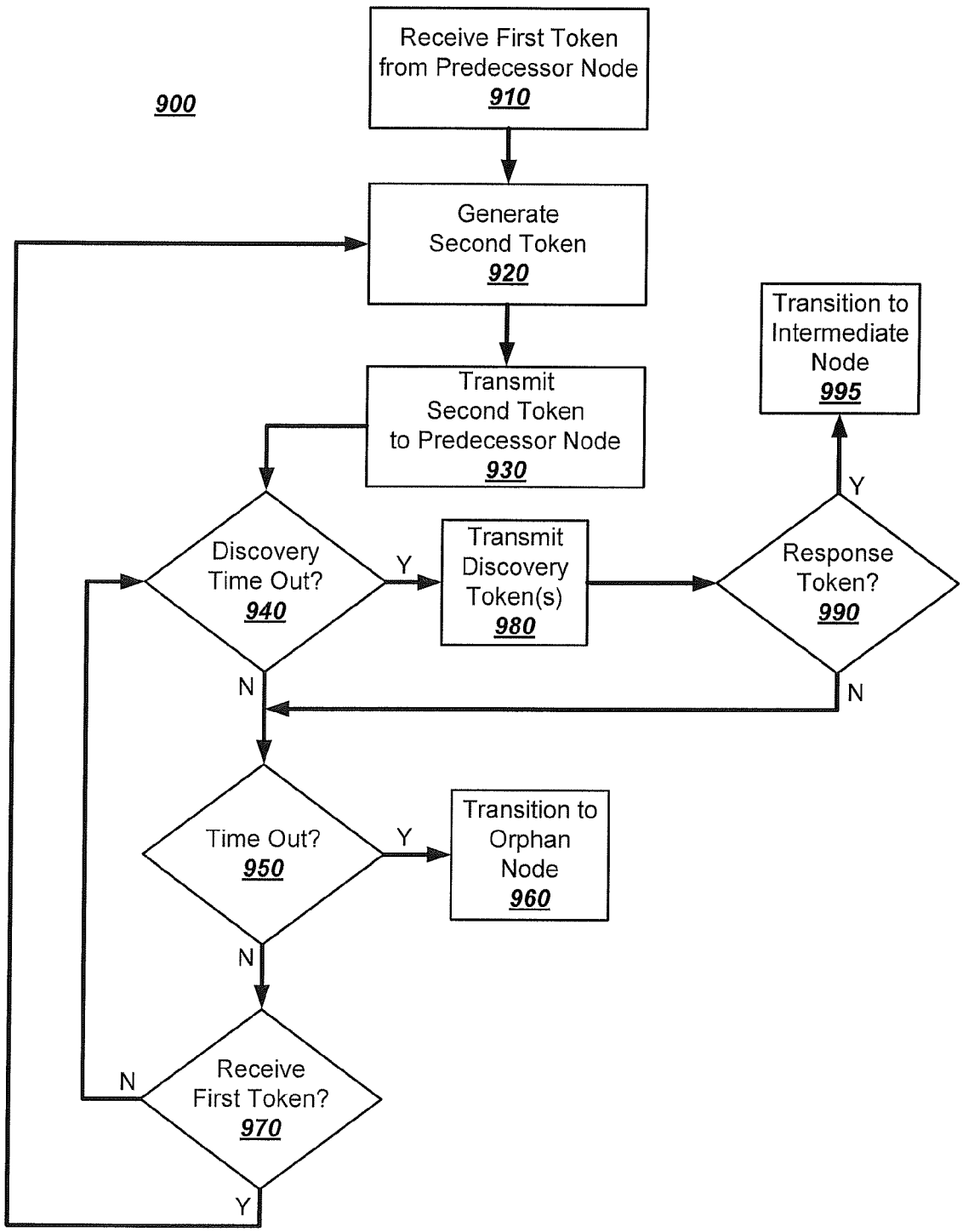
FIG. 9 illustrates a flowchart view of a portion of the operations of a second end node as presented in FIGS. 1A and 1B in further detail, in accordance with various embodiments.

Referring now to FIG. 9, a flow chart of a portion of operations of a node operating as a second end node 900 in accordance with various embodiments is shown. The node operating as a second end node 900 receives a first token from a predecessor node in block 910. In block 910, the node operating as the second end node 900 consumes the first token, regardless of whether nodal data is available to be transmitted from the node operating as the second end node 900. In one embodiment, delivery of the first token to the node operating as the second end node 900 automatically results in the node operating as the second end node 900 generating a second token 920.

In addition to generating the second token, the node operating as the second end node 900 may also determine whether nodal data is available to be transmitted to the other active nodes in the physically segmented logical token network. In one embodiment, the nodal data from the node operating as the second end node 900 is appended to the packet containing the second token for transmission by the node operating as the second end node 900 in block 930. Alternatively, the nodal data from the node operating as the second end node 900 could also be sent in a packet prior to the transmission of the second token. Accordingly, regardless of whether supplemental data has been attached by the node operating as the second end node 900, the second token is transmitted to the predecessor node of the node operating as the second end node in block 930.

The transmission of the second token to the predecessor node in block 930 notifies the first end node that a new round of communication may be initiated. In one configuration, the second token may not be claimed by intermediate nodes and is automatically transmitted to the node's predecessor node. Once the second token reaches the first end node, a new first token will be generated as previously described in FIG. 7.

The node operating as a second end node 900 determines whether the discovery timer has expired in query block 940. Upon discovery time-out in block 940, the node operating as the second end node transmits a discovery token to a potential successor node and/or orphan node in block 980. In one embodiment, the discovery token is a second token transmitted in a different direction. The node operating as a second end node 900 waits for a response token in query block 990, until either a response timer times out or a response token is received. If a response token is received, the second end node transitions to an intermediate node in block 995.

If the discovery timer has not timed out, the node operating as the second end node 900 determines whether a communication threshold for receiving a token within a given time-out period has been reached in query block 950. In one embodiment, the node operating as the second end node 900 is configured to transition to an orphan node operational state in block 960, if the threshold has been passed or the associated time-out timer has expired. Alternatively, the node operating as the second end node 900 could automatically generate a second token when a given overall time-out threshold, based in part on the number of known active nodes in the network, is reached, so long as the first end node is not similarly configured.

If the time-out timer has not expired, the node operating as the second end node 900 awaits receipt of the first token from the predecessor node in block 970. In various embodiments, the node operating as the second end node 900 also includes timing modules to identify the range of anticipated arrival times of the next first token. If the next first token does not arrive within the calculated time period, the node operating as the second end node 900 may optionally generate another second token in accordance with one embodiment. Alternatively, upon expiration of the response timer, the node operating as the second end node 900 may optionally designate itself as an orphan node. In one embodiment, the node operating as the second end node 900 continues to wait in a time-out loop as part of query blocks 940, 950, and 970 until either a first token is received and the node operating as the second end node 900 generates another second token in block 920 or until one of the two timers expires in either query block 940 or 950.

Figure 10:
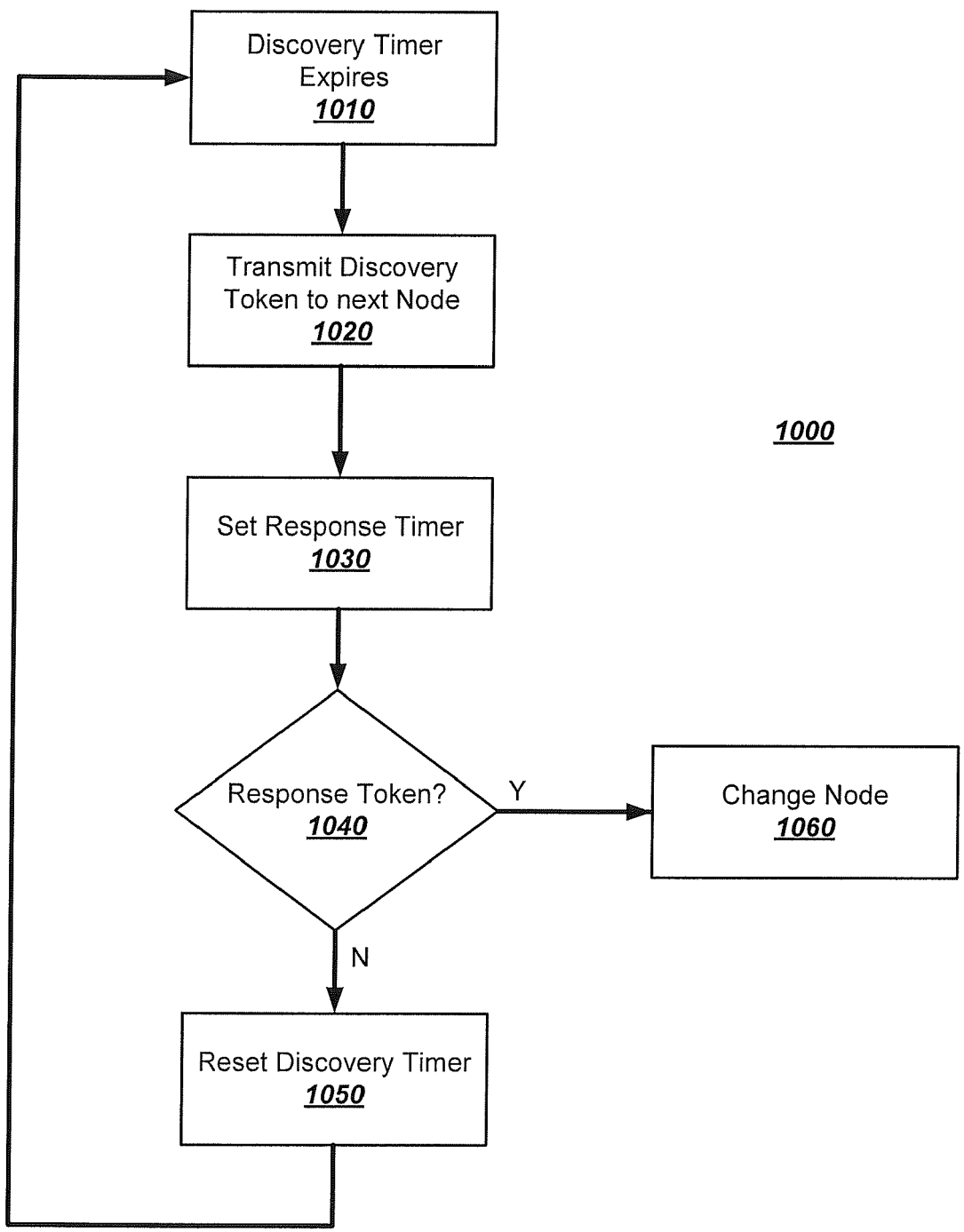
FIG. 10 illustrates a flowchart view of a portion of the operations of a network node in accordance with various embodiments.

Referring to FIG. 10, a flowchart of a portion of operations of a network communication arrangement performing node discovery in accordance with various embodiments is shown. A discovery timer expires in block 1010, the node(s) charged with discovery in the communication arrangement 1000 transmit(s) a discovery token to a next node in block 1020. The associated response timer monitoring the associated transmission segment is set in block 1030. If a response token is received prior to the expiration of the timer in query block 1040, the operational state of both nodes is changed accordingly in block 1060. Otherwise the discovery timer is reset in block 1050. The discovery timer may be reset based in part on the number of nodes in the network. Alternatively, the discovery timer may be set based on the transmission latency of the network between nodes.

Figure 11A:
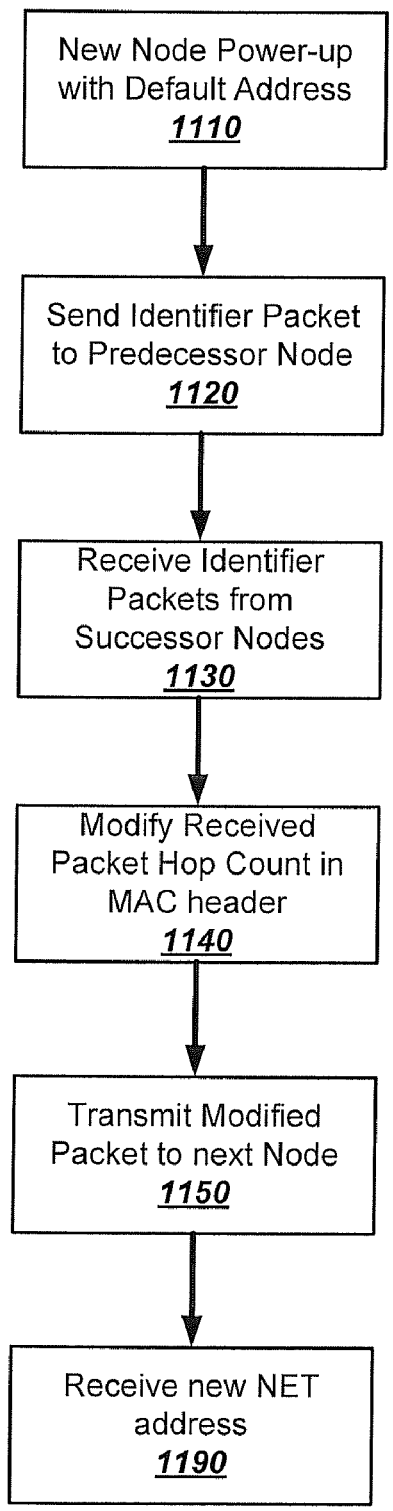
FIGS. 11A and 11B illustrate network node discovery in accordance with various embodiments.
Figure 11B:
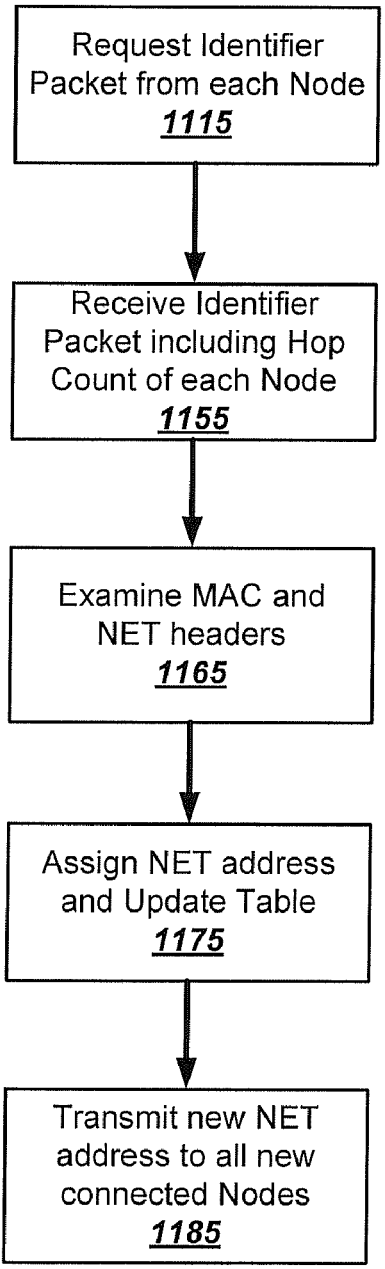

Referring to FIGS. 11A and 11B, flowcharts of portions of operations of node discovery at a network layer for a new networking node (FIG. 11A) and a network server (FIG. 11B) in accordance with various embodiments is shown. In FIG. 11A a new networking node similar to those previously described, powers-up with a default address in block 1110. This power-up process may occur as a result of a variety of activities, such as upon insertion of the node into the network or activation following a prolonged orphan state. As the new nodes are added to the network, they must be configured to interact with the network server and be addressable at the network layer (NET). To facilitate configuration, the network server requests an identifier packet from each node in block 1115 of FIG. 11B. In response to the server's request, the new node transmits the requested identifier packet using the default address to a predecessor node in block 1120 of FIG. 11A. In one embodiment, the new node may also receive identifier packets from successor nodes in block 1130. The new node modifies the received MAC (Medium Access Control) header by incrementing the hop count in block 1140 and transmits the modified packet identifier to the predecessor node in block 1150.

The server receives each identifier packet including the hop counts in block 1155. Based in part on an examination of the received MAC and NET headers in block 1165, the server is able to determine the relative distance of each node from the server and assign an appropriate NET address to each node in block 1175. The server also updates the relative network topology look-up table entries for each of the recorded nodes. In one embodiment, the server maintains a historical topology database. This enables the server to identify various node qualities and performance tendencies. The topology table includes node connection information, such as found, inserted, visible, intermittent connectivity, lost, or removed.

Once the server has assigned each of the nodes a new NET address, the addresses are transmitted from the server to all the network nodes in block 1185. The new network node receives a new NET address in block 1190 and changes from the default address.

In various embodiments the node discovery process is performed periodically to detect changes in network topology and identify addressing problems, such as duplicate network identification or multiple nodes using the default identification. Changes to the network topology are detected each time the node discovery process is run and the topology table is thereby synchronized with the actual configuration of the network.

As such, the node discovery process does not only discover new nodes, but the topology table generated by the server can categorize the nodes into various topological states, based in part on the current discovery results and in part on previous discovery attempts. The various topological states include found, inserted, visible, intermittent, lost, or removed.

Although specific embodiments have been illustrated and described herein, it will be appreciated by those of ordinary skill in the art and others, that a wide variety of alternate and/or equivalent implementations may be substituted for the specific embodiment shown in the described without departing from the scope of the present invention. For example, the network 1200 in FIG. 12 could implement the described physically segmented logical token network. Where a computing device 1210 could operate as a first end node generating a first token 1240 and a client computing device 1230 could operate as a second end node generating a second token 1250. The computing device 1210 and the client computing device 120 may include general and/or special purpose computing devices, such as a desktop computer, a personal digital assistant (PDA), a server, and/or console suitably configured for practicing the present invention in accordance with at least one embodiment.

The various network devices 1220 could function as intermediate nodes, where the routers 1220a and 1220b forward packets between the computing device 1210 and the client computing device 1230 and the bridge 1220b selectively forwards packets received from one predecessor router 1220a to the appropriate successor router 1220c. In this manner, a virtual private network could be established between the computing device 1210 and the client computing device 1230.

Thus, a wide variety of alternate and/or equivalent implementations may be substituted for the specific embodiments shown and previously described without departing from the scope of the present invention. This application is intended to cover any adaptations or variations of the embodiments discussed herein. Therefore, it is manifested and intended that the invention be limited only by the claims and the equivalence thereof.

Whereas the present invention has been described in particular relation to the drawings attached hereto, it should be understood that other and further modifications apart from those shown or suggested herein, may be made within the scope and spirit of the present invention.

What is claimed is:

1. A method comprising:
   generating by a first node operating as a bottom end node in a downhole network a discovery token, and transmitting the discovery token to determine if there is a second node in a successor direction operating as an orphan node;
   upon receiving the discovery token by the second node operating as an orphan node, selectively activating the second node to operate as a bottom end node to supplant the first node as the bottom end node, and transmitting by the second node a response token back to the first node; and
   receiving the response token at the first node, and in response, configuring the first node to operate as an intermediate node.

2. The method of claim 1, wherein the transmitting of the discovery token comprises selectively transmitting the discovery token in the successor direction to an immediately coupled second node operating as an orphan node upon expiration of a discovery timer and subsequent receipt of a transmission token.

3. The method of claim 1, wherein the transmitting of the discovery token comprises selectively transmitting the discovery token to an immediately coupled successor node operating as an orphan node upon receiving a transmission token.

4. The method of claim 3, wherein the transmitting of the response token comprises automatically transmitting the response token back to the first node to identify the second node as the bottom end node to the first node.

5. The method of claim 1, wherein the transmitting of the discovery token comprises selectively transmitting the discovery token, upon receiving a transmission token, in an opposite direction to an immediately coupled predecessor node in the downhole network.

6. The method of claim 1, wherein a successor node operating as an orphan node is inactive for a defined time period prior to receiving the discovery token and transmitting the response token.

7. The method of claim 1, wherein the first node and the second node are temporary logical end nodes in the downhole network and the selective activating of the second node further comprises automatically transmitting the discovery token iteratively to at least one next node, each next node operating as an orphan node, until an actual bottom end node of the downhole network is activated to operate as the bottom end node of the downhole network.

8. The method of claim 1, wherein the generating of a discovery token comprises receiving a first transmission token at the first node from an immediately coupled predecessor node, and in response, generating a second transmission token and transmitting the second transmission token to the immediately coupled predecessor node.

9. The method of claim 8, wherein the transmitting of a discovery token includes selectively transmitting the discovery token to an immediately coupled successor node configured to operate as an orphan node.

10. The method of claim 9, wherein the discovery token is the second transmission token transmitted in a different direction from a direction toward the predecessor immediately coupled node from which the first transmission token was received.

11. The method of claim 9, wherein the second node is the immediately coupled successor node and the response token is the second transmission token.

12. The method of claim 9, wherein the selective transmission of the discovery token to the immediately coupled successor node comprises transmitting the discovery token after the expiration of a discovery timer.

13. The method of claim 12, wherein time for the discovery timer on the first node is longer than time for a communication time-out timer on the second node.

14. A communication arrangement for a downhole network, comprising:
   a first node configurable to operate as either an intermediate node or a bottom end node;
   a second node configurable to operate as either a bottom end node or an orphan node;
   a transmission segment connecting the first and second nodes with the second node in a successor relationship to the first node;
   wherein the first node is adapted to transmit a discovery token onto the transmission segment while operating as a bottom end node of the downhole network;
   wherein the second node is adapted to transition to operate as a bottom end node of the downhole network on receipt of the discovery token while operating as an orphan node, and transmit a response token back to the first node; and
   wherein the first node is further adapted to transition to operate as an intermediate node of the downhole network on receipt of the response token after transmitting the discovery token.

15. The communication arrangement of claim 14, wherein the nodes employ at least a transmission and a repeat token to facilitate communication among the nodes.

16. The communication arrangement of claim 14, wherein the transmission token is a down-token, the repeat token is an up-token in a downhole network, and the bottom end node is configured to automatically generate and transmit the up-token upon receipt of the down-token and to selectively generate and transmit the discovery token.

17. The communication arrangement of claim 16, wherein the selective generation and transmission of a discovery token is based in part on the expiration of a discovery timer.

18. The communication arrangement of claim 14, wherein the second node when configured to operate as an orphan node generates a response token upon receipt of a token.

19. The communication arrangement of claim 14, wherein the first node is further configurable to operate as an orphan node based in part on the expiration of a communication timer.

20. The communication arrangement of claim 19, wherein each of the first and second nodes automatically resets the communication timer upon receipt of an intervening communication.

* * * * *